Aug. 1, 1944.  J. F. McCANN  2,355,003
LUBRICATING MECHANISM FOR SPROCKET CHAINS
Filed March 12, 1943  2 Sheets-Sheet 2
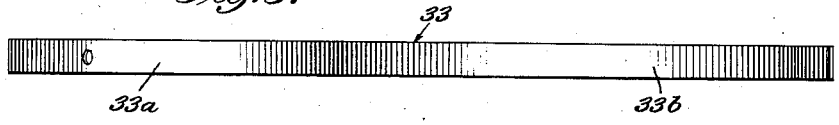
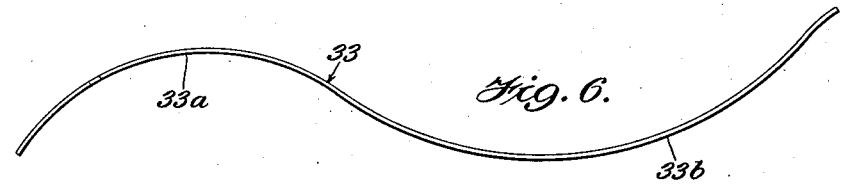
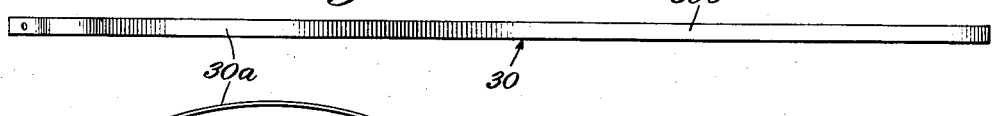
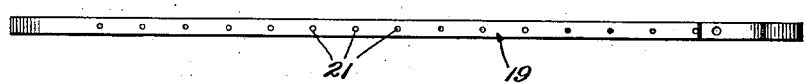
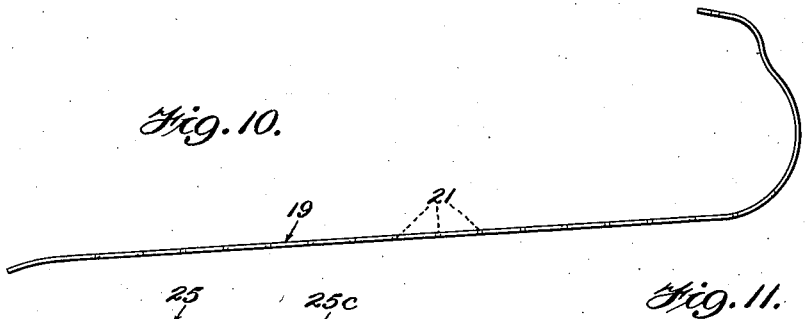
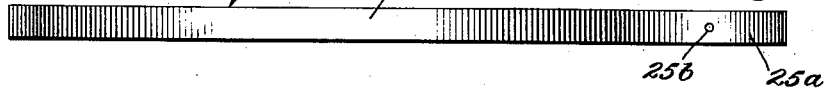
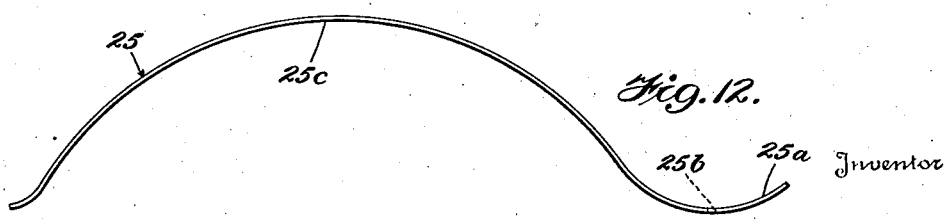
Inventor
JOHN F. MC CANN,
By B. B. Collings
Attorney Patented Aug. 1, 1944

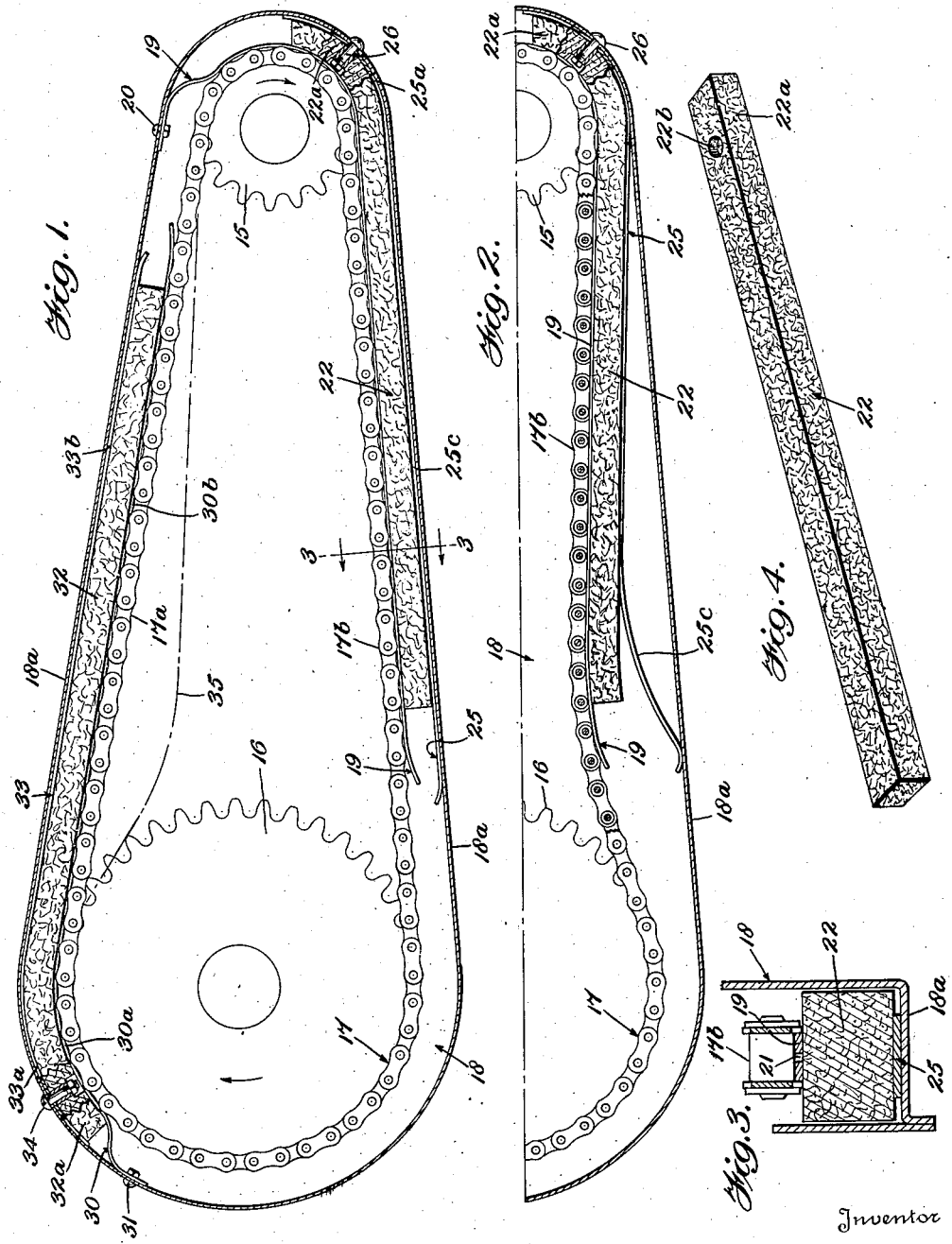

2,355,003

UNITED STATES PATENT OFFICE 2,355,003

LUBRICATING MECHANISM FOR SPROCKET CHAINS

John F. McCann, Springfield, Mass., assignor to Chain Belt Company, Milwaukee, Wis., a corporation of Wisconsin Application March 12, 1943, Serial No. 478,934

6 Claims. (Cl. 184—16)

This invention relates to sprocket chain lubricators, and constitutes a further development in devices of the general type described and claimed in my prior U. S. Patent No. 1,998,682 granted April 23, 1935. Briefly, the mechanism disclosed in said patent comprised a housing for enclosing and protecting a chain and sprocket drive, such as is widely used for example on motorcycles, and a lubricating device mounted within such housing for continuously supplying lubricant to the chain. A portion of the peripheral wall of the housing paralleled the normally slack run of the chain as well as a portion of the periphery of one of the sprockets, being spaced sufficiently from the outer face of the chain to accommodate the lubricator which comprised an elongated lubricant-absorbent pad, such as a yieldable fibrous strip, disposed adjacent to and supported by said paralleling portion of the housing wall, and a flexible perforated metallic strip, one end of which was secured to the housing and the body portion of which was disposed along the inner surface of said absorbent pad, between it and the outer face of the chain.

The flexible metallic strip was preferably of such width as to lie wholly between the side bars of the chain links, thus being engageable by the chain rollers or other sprocket tooth engaging members, whereby as the chain traveled along the strip said rollers or members would press it against the yielding lubricant-containing pad, compressing the latter and causing the lubricant carried thereby to ooze out through the perforations in the metallic strip, there to be picked up by the chain elements and distributed to the chain bearings and other wearing surfaces. The housing was constructed in two telescoping sections to accommodate adjustment of one sprocket toward and from the other, whereby slackness in the chain due to ultimate wear in the chain bearings might be taken up.

The present invention is distinguished from that or my said prior patent in that in the instant case the lubricator is so constructed and arranged as to not only perform the lubricating function referred to above, but also to be maintained in constant uniform engagement with the chain regardless of lengthening of the latter due to unavoidable ultimate wear in its pins and bearings. The lubricator automatically takes up the slack in the lengthened chain without necessity for increasing the distance between the sprocket centers, thus making it unnecessary to construct the housing in telescoping sections. Further, by providing a similar arrangement adjacent the normally taut run of the chain, when the load shifts—as for example, should the direction of drive be reversed, or in a motorcycle drive, during deceleration—so that the normally taut run becomes slack and vice versa, the automatic take-up function will continue under all conditions and the chain will be prevented from fouling the sprockets and/or slapping against the housing.

As in my Patent No. 1,998,682, the present invention has been illustrated in the accompanying drawings and will be described principally in connection with a typical chain and sprocket drive for a motorcycle; however, this is for purposes of disclosure only, and it will be apparent to those skilled in the art that the principle is readily adaptable to similar drives for other purposes.

In the said drawings, forming a part of this specification, in which like reference characters designate like parts in all the views:

Figure 1 is a vertical longitudinal sectional-elevational view, showing a conventional chain and sprocket drive for a motorcycle, with one form of lubricating mechanism constructed and arranged in accordance with the present invention applied thereto, the parts being illustrated in the positions they occupy when the chain is new and unworn;

Fig. 2 is a fragmentary view similar to Fig. 1, illustrating the action of the lubricator as the chain lengthens due to unavoidable ultimate wear in its pins and bearings;

Fig. 3 is an enlarged cross sectional view, taken approximately on the plane indicated by the line 3—3 of Fig. 1, looking in the diretcion of the arrows;

Fig. 4 is a perspective view of one of the yielding strips or pads;

Figs. 5 and 6 are plan and side elevational views respectively of the spring or resilient metal backing member for the fibrous pad which is associated with the normally taut upper run of the chain shown in Fig. 1;

Figs. 7 and 8 are plan and side elevational views respectively of the resilient presser strip which extends along the inner face of said upper pad for engagement by the chain;

Figs. 9 and 10 are plan and side elevational views respectively of the corresponding chain-engaging resilient presser strip which is disposed along the inner face of the lower absorbent pad associated with the normally slack run of the chain; and Figs. 11 and 12 are plan and side elevational views respectively of the resilient backing member or spring for said lower pad.

Referring more specifically to the said drawings, the drive illustrated in Fig. 1 comprises the driving sprocket 15, driven sprocket 16 and chain 17 trained about such sprockets, which are considered as normally rotating in a clockwise direction as indicated by the arrows, thus making the upper run 17a of the chain the taut or driving run and the lower run 17b the slack or return run. The drive is enclosed within a casing or housing 18, the peripheral wall 18a of which parallels in suitably spaced relation the normal path of travel of the chain about and between the sprockets.

A resilient chain-engaging presser strip 19 has one end anchored to the housing as at 20, and extends partially around the driving sprocket 15 in close proximity to the outer face of the chain 17 and thence rearwardly beneath the slack run 17b. The strip 19, which is preferably of spring steel or equivalent material, has a normal or free conformation substantially as shown in Figs. 9 and 10, and as in my prior Patent No. 1,998,682, is provided with one or more series of perforations 21 through which the lubricant may pass to be picked up by the chain as it traverses the strip. A yielding lubricant-absorbent pad or strip 22, which may be of felt or similar fibrous material, is disposed behind the resilient metal strip 19, between it and the peripheral wall 18a of the housing and beneath at least the major portion of the slack run 17b of the chain.

Between the outer face of the pad 22 and the inner face of the housing wall 18a there is disposed a resilient metal backing strip 25, also preferably of spring steel or equivalent material, and of a normal or free conformation substantially as shown in Figs. 11 and 12. One end portion 25a of this backing member, as well as an end portion 22a of the absorbent pad 22, partially embrace the sprocket 15 and are anchored to the housing wall 18a by a stud or screw 26 received in the apertures 25b of backing strip and 22b of the pad.

When the parts thus far described are assembled with a chain and sprocket drive in which the chain is new and therefore has only the normal working slack in the run 17b, the free end portion 25c of the resilient backing member 25 will be flattened out beneath such slack run against the peripheral wall 18a of the housing, substantially as illustrated in Fig. 1. In this condition, with the absorbent pad 22 being saturated with a suitable lubricant, such for example as a light oil, the lubricator will function substantially as in my said prior Patent No. 1,998,682, with the chain pressure upon the resilient strip 19 compressing the pad 22 sufficiently to cause its lubricant to ooze up through the perforations 21, to be picked up by the chain rollers and distributed to the wearing surfaces of the chain and of the sprockets. Such lubrication of a standard motorcycle chain drive, together with the protection afforded by the housing 18 against dust, grit and water, has been found by actual trials to reduce the chain wear over that occurring in the usual unlubricated and unprotected motorcycle drives by as much as 80% to 85%.

Notwithstanding the great increase in chain life resulting from lubrication and protection of the drive as just described, some wear is of course unavoidable, with consequent lengthening of the chain, and unless this is taken care of the slack in the run 17b of the chain will become so great that the pressure exerted by this run upon the strips 19 and 22 will be lessened and the intended action of the lubricator interfered with. The slack run may also jump up and down, resulting in only intermittent engagement between it and the presser strip 19 with further impairment of the lubrication, pounding of the chain, and possible fouling of the sprockets.

With the present arrangement however, the spring backing member 25, working against the housing wall 18a as a stop, constantly tends to raise the lubricator strips 22 and 19 and maintain the latter in continuous full engagement with the chain, as shown in Fig. 2, thus securing uniform lubrication regardless of increasing slack in the run 17b. Since the chain is elevated by the backing member 25 along with the lubricator elements 22 and 19, the said member also serves as an automatic slack take-up, rendering adjustment of the distance between the sprocket centers unnecessary, and enabling the housing 18 to be made in one piece instead of in telescoping sections as in my said prior patent. The free conformation of the members 19 and 25 is such that as the latter elevates the lubricator toward the Fig. 2 position the said lubricator is maintained in uniform contact with the chain throughout the entire length of the lubricator, as shown in said figure.

When a motorcycle is decelerated the sprocket 16 tends to become the driver and the tension on the respective chain runs is reversed, with the result that the run 17a becomes the slack run and the run 17b becomes the taut run. This condition may also arise in similar drives employed for other purposes, as well as in drives where the direction of rotation of the sprockets 15 and 16 is intermittently reversed. When it does occur, assuming a slackness in the chain as indicated in Fig. 2, as the run 17b becomes taut the lubricator elements 19 and 22 are pressed downwardly by it against the action of the spring backing member 25, and the parts will reassume substantially the positions illustrated in the lower portion of Fig. 1, with the backing member 25 flattened out against the housing wall 18a.

However, this will permit the upper run 17a of the chain to sag and assume a substantially catenary position between the sprockets 15 and 16 as it becomes slack, which condition as above indicated will be apt to induce pounding of the chain and its possible fouling of the sprockets. To avoid this an arrangement similar to that associated with the run 17b may be provided for the run 17a.

That is to say, as shown in Fig. 1, a resilient chain-engaging presser strip 30, preferably of spring steel or equivalent material, having a free conformation substantially as illustrated in Figs. 7 and 8, has one end secured as at 31 to the housing 18, its curved portion 30a embracing a portion of the periphery of the sprocket 16, and its reversely curved portion 30b extending forwardly for engagement by the rollers or other cross members of the run 17a of the chain. A yielding pad or strip 32, similar to the pad 22, is disposed outwardly of the resilient strip 30, and a spring backing member 33 is interposed between the outer face of the pad 32 and the wall 18a of the housing. This backing member 33, which is likewise preferably of spring steel or similar material, has a free conformation substantially as shown in Figs. 5 and 6, and its curved end portion 33a—which substantially complements the curvature of the housing wall 18a around the sprocket 16—together with the end portion 32a of the pad 32 are anchored to the housing as by the bolt or stud 34. The reversely curved portion 33b of the backing member extends forwardly above the run 17a of the chain, as shown in Figs. 7 and 8.

When the run 17a of the chain is taut, whether the chain be new or worn, the parts will occupy the positions shown in Fig. 1, with the forward portion 33b of the backing member 33 flattened out against the housing wall 18a. With a worn chain, upon deceleration or reversal of the drive whereby the run 17a becomes the slack run, the backing member 33 will tend to resume its free conformation, urging the pad 32 and strip 30 downwardly, similarly as the corresponding backing member 25 urged its associated elements 22 and 19 upwardly, maintaining the said pad and strip in close co-operative association with the chain run 17a throughout their length and at the same time automatically taking up the slack in the said chain. The free conformation of the backing member 33 and the resilient strip 30 is such as to cause the worn chain to follow a path substantially as indicated by the broken line 35 in Fig. 1 rather than the catenary position the chain would normally assume.

While one form of the invention has been illustrated and described for purposes of disclosure, it is obvious that those skilled in the art may vary the details of construction as well as the precise arrangement of parts without departing from the spirit of the invention, and therefore it is not wished to be limited to the above disclosure except as may be required by the claims.

What is claimed is:

1. In lubricating mechanism for sprocket chains, comprising a lubricant-absorbent strip and a flexible presser strip disposed for pressural traverse by a run of the chain, whereby lubricant may be pressed from the absorbent strip and transferred to the chain: the combination of a resilient backing member for said absorbent strip responsive to variations in slack conditions in the chain run to maintain said presser strip in continuous engagement with said run under all degrees of slackness, whereby interruptions in said lubricant transfer due to such variations may be prevented.

2. In lubricating mechanism for a chain and sprocket drive, comprising a yieldable lubricant-absorbent strip and a resilient presser strip disposed along one face thereof for pressural traverse by a run of the chain, whereby lubricant may be pressed from the absorbent strip and transferred to the chain: the combination of means for maintaining constant pressural engagement between said chain run and presser strip under varying conditions of slack in said run, comprising a resilient strip disposed along the opposite face of said absorbent strip and constantly pressing all portions of the presser strip engageable by the chain run against the latter to take up any slack therein and prevent interruption in the lubricant-transferring engagement between the absorbent and presser strip and the chain.

3. A lubricating mechanism for traverse by a run of a sprocket chain whereby to supply lubricant to the chain, said run being subject to changes in conditions of slack therein: said mechanism comprising a yieldable lubricant-absorbent pad interposed between a flexible presser strip extending along one face thereof and a resilient backing strip disposed along the opposite face thereof, said presser strip being pressurally traversable by said chain run whereby lubricant may be pressed from the pad for transfer to the chain, and said backing strip serving to press the pad and presser strip against the chain run to automatically take up slack therein and prevent interruption in the lubricant-transferring engagement of the pad and presser strip with the chain.

4. In a chain and sprocket drive having mechanism associated with it for supplying lubricant to the chain, said mechanism comprising a lubricant-carrying pad and a presser strip disposed along one face thereof for pressural traverse by a run of the chain whereby lubricant may be pressed from the pad and transferred to the chain: the combination therewith of means for preventing interruption of the pressural engagement between the presser strip and chain run due to increasing slack in the latter, comprising a resilient backing member for the pad acting to continuously maintain said engagement between the presser strip and chain.

5. In a chain and sprocket drive comprising a pair of spaced sprockets and a chain trained about them, a housing having a wall adjacent and substantially paralleling at least one run of the chain between the sprockets; means for supplying lubricant to the chain, comprising a yieldable lubricant-absorbent pad disposed between said chain run and the housing wall, and a flexible presser strip extending along the inner face of said pad for pressural traverse by the chain whereby lubricant may be pressed from the pad and transferred to the chain; and means for preventing interruption in such lubricant transfer resulting from changes in slack conditions in the chain run, comprising a resilient backing strip disposed between the outer face of said pad and said housing wall and reacting against said wall whereby to exert continuous pressure on the pad in the direction of the chain run to automatically take up slack therein and maintain constant pressural engagement between the chain and said presser strip.

6. In a chain and sprocket drive comprising a pair of spaced sprockets and a chain trained about them to provide under normal driving conditions a taut or driving run and a slack or return run: mechanism for supplying lubricant to said chain comprising a yieldable pad and a presser strip disposed for pressural traverse by said slack run whereby lubricant carried by the pad may be transferred to the chain, and a resilient backing member for said pad acting to continuously press said pad and strip against the chain to take up slack in said run and prevent interruption of said lubricant transfer; and a similar mechanism disposed along the normally taut run of the chain for co-operation therewith during deceleration or reversal of the drive when the taut and slack runs are reversed.

JOHN F. McCANN.